A. GROSS.
JOINT CLUTCH.
APPLICATION FILED DEC. 14, 1915.

1,201,818.  Patented Oct. 17, 1916.

WITNESSES

INVENTOR
A. Gross
BY
ATTORNEYS

UNITED STATES PATENT OFFICE.

ALBERT GROSS, OF NEW YORK, N. Y.

JOINT-CLUTCH.

1,201,818.  Specification of Letters Patent.  Patented Oct. 17, 1916.

Application filed December 14, 1915. Serial No. 66,740.

*To all whom it may concern:*

Be it known that I, ALBERT GROSS, a citizen of the United States, and a resident of the city of New York, Flushing, borough of Queens, in the county of Queens and State of New York, have invented a new and Improved Joint-Clutch, of which the following is a full, clear, and exact description.

My invention relates to joint clutches used on wind shields of the sectional hinged type.

An object of the invention is to provide an inexpensive, simple, strong and reliable joint clutch which will maintain the hinged sections at any desired angle.

Another object of the invention is to provide a joint clutch the gripping parts of which are housed so as to be rain- and dust-proof.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
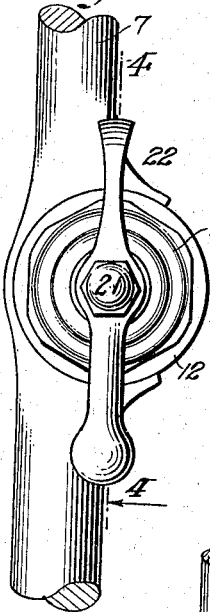
Figure 2:
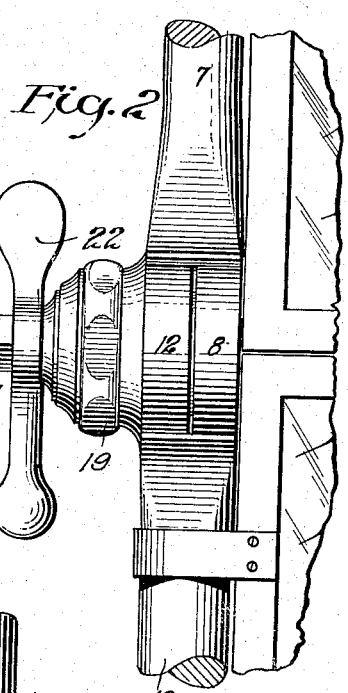
Figure 3:
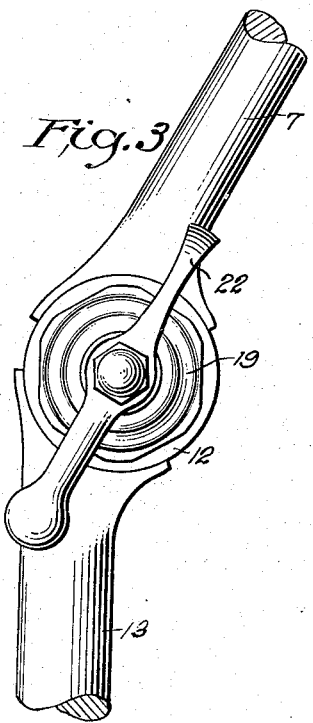
Figure 4:
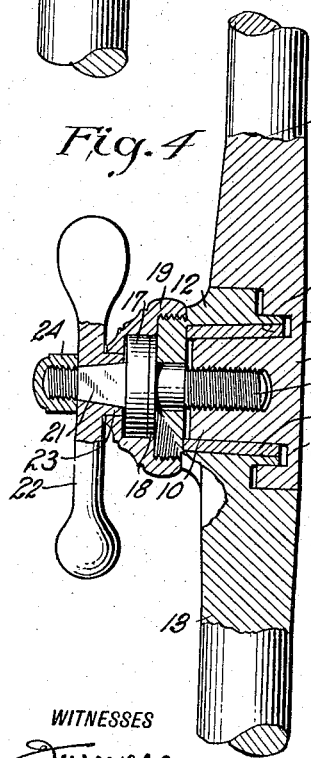
Figure 5:
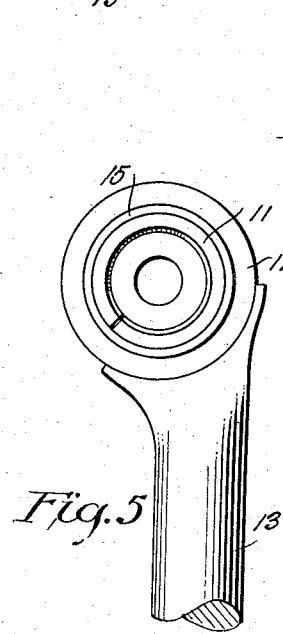
Figure 6:
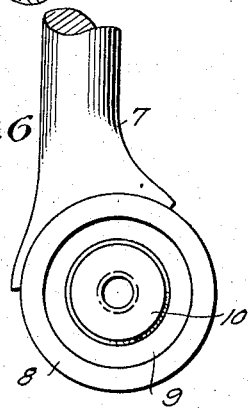

Figure 1 is an elevation of an embodiment of my invention; Fig. 2 is a side elevation of the same; Fig. 3 is a view similar to Fig. 1 with the sections disposed angularly to each other; Fig. 4 is a section on line 4—4, Fig. 1; Fig. 5 is a face view of one member of the joint with the frictional sleeve therein; and Fig. 6 is a similar view of the second member.

Referring to the drawings, 7 is a frame member a hinge portion 8 of which is provided with an annular recess or groove 9 which surrounds an upwardly tapering projection 10. A frictional split sleeve 11 is mounted on the projection. The outer peripheral surface of said frictional sleeve has substantially the same taper as the inner periphery of said sleeve, so that the thickness of the wall of said sleeve is substantially uniform.

A hinge portion 12 of a coöperating frame member 13 has a tapering recess 14 for coöperating with the outer tapering periphery of the frictional sleeve 11. A collar 15 is formed on the hinge portion 12 at the recess 14. The outer diameter of said collar 15 is substantially equal to the larger diameter of the groove 9, so that an additional bearing between the two hinge portions is formed by said collar and groove.

The two members are maintained together by a screw 16 threaded into the projection 10 through the bottom of the recess 14 in the hinge portion 12. The screw 16 has a head 17 spaced from the hinge portion 12 by a friction washer 18. The frictional engagement between the head 17, the washer 18 and the hinge portion 12 is maintained by a nut 19 screwed upon the hinge portion 12. The screw 16 and the nut 19 are threaded reversely; that is to say, if one has a right-hand thread, the other has a left-hand thread.

The screw 16 has a stem 21 of angular cross section projecting out of the nut 19. An operating handle 22 engages the stem. The handle has preferably a collar 23 extending into the nut 19 whereby an additional bearing is formed for the screw when the same is turned by the handle. A cap 24 is secured to the stem 21 to lock the handle to the stem.

When the screw 16 is moved out of the projection 10 by the movement of the handle 22, the head 17 of the screw by its engagement with the nut 19 pulls the hinge portion 12 away from the hinge portion 8. Consequently, the pressure on the friction sleeve 11 is reduced and the same is allowed to expand, thereby releasing its grip on the hinge portions and allowing the hinge portion 12 to move relative to the hinge portion 8. When the screw 16 is moved into the projection 10 the head 17 of the screw causes the hinge portion 12 to move toward the hinge portion 8, consequently forcing the split frictional sleeve 11 to clamp or grip the bevel periphery of the projection 10 and the recess 14, thereby locking the two hinged sections and preventing their relative movement.

The friction washer 18 also participates in the gripping between the two hinge portions 8 and 12, in view of the fact that when the screw 16 is tight in the projection 10 said screw forms part of the projection tending to participate in all the movements thereof. The split sleeve and the washer are preferably made of brass, although any other suitable frictional material can be used. The other members of the hinge or joint are made of forged steel. It will be noted that all the frictional parts of the device are inclosed, so as to be dust- and rainproof.

While I have described the principle of operation, together with the device which I now consider to be the best embodiment thereof, I desire to have it understood that the device shown is merely illustrative and that such changes may be made as are within the scope of the appended claims.

I claim:

1. In a device of the class described, a hinge member having a tapering projection, a second hinge member having a tapering recess, a split, frictional, tapering sleeve within said recess for engaging the tapering projection, a screw threaded into the projection through the second member, means for securing the screw to the second member so that the same is free to rotate but prevented from axial displacement relative to said second member, and means for manipulating the said screw whereby the pressure on said split, frictional sleeve may be varied.

2. In a device of the class described, a hinge member having a tapering projection, a second hinge member having a tapering recess, a split, frictional, tapering sleeve adapted to be in engagement with the periphery of the recess and the projection, a screw threaded into the projection, means threaded reversely of the screw for securing the screw to the second hinge member so that said screw is free to revolve in said second member but prevented from axial displacement relative to said second member, frictional means interposed between the screw, and said second hinge member, and means for operating the screw whereby the pressure on said split sleeve may be varied.

3. In a device of the class described, a hinge member having a tapering projection and an annular groove about the projection, a second hinge member having a tapering recess and a collar for engaging the annular groove of the first member, a split, tapering, frictional sleeve for engaging the periphery of the recess and projection, a screw threaded into the projection through the second member, said screw having a head, a friction washer between the head of the screw and the second hinge member, a nut having a thread reverse to the screw securing the screw to the second hinge member so that said screw is free to turn in said second member but prevented from moving axially relative to said second member, said screw having a shank, a handle detachably associated with said shank, and means securing it to said shank.

In testimony whereof I have signed my name to this specification in the presence of two subscribing witnesses.

ALBERT GROSS.

Witnesses:
B. JOFFE,
G. H. EMSLIE.

Copies of this patent may be obtained for five cents each, by addressing the "Commissioner of Patents, Washington, D. C."